INVENTORS
ALFRED WESSTROM
KASPER K. FALK
BY- H.O. Clayton
ATTORNEY

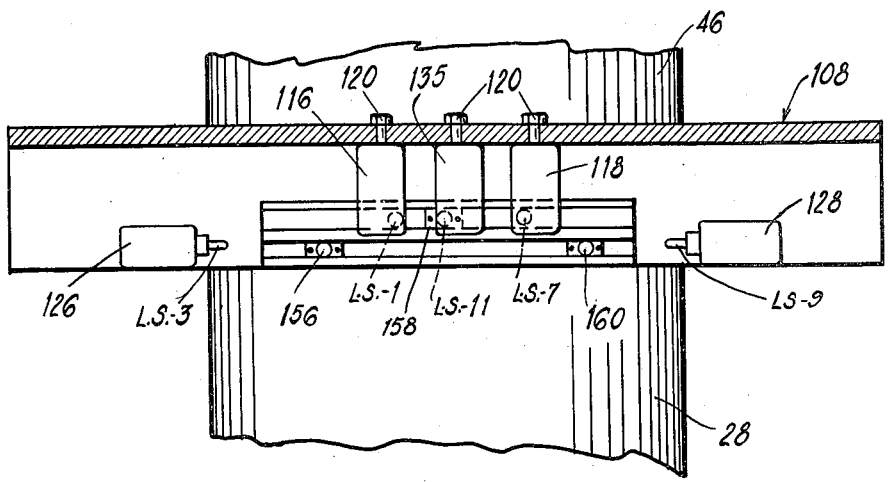
*Fig. 5*
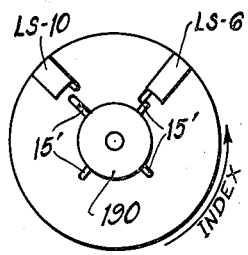
*Fig. 10*
| | POSITIONS | | |
|---|---|---|---|
| | JOG | RUN | RESET |
| 1 | | X | |
| 2 | X | | |
| 3 | | | X |
| 4 | X | | |
| 5 | | | NOT USED X |
| 6 | | | X |
| 7 | X | | |
| 8 | | | X |
| 9 | X | X | |
| 10 | | X | |
*Fig. 12*
INVENTORS
ALFRED WESSTROM
KASPER K. FALK
BY- H.O. Clayton
ATTORNEY

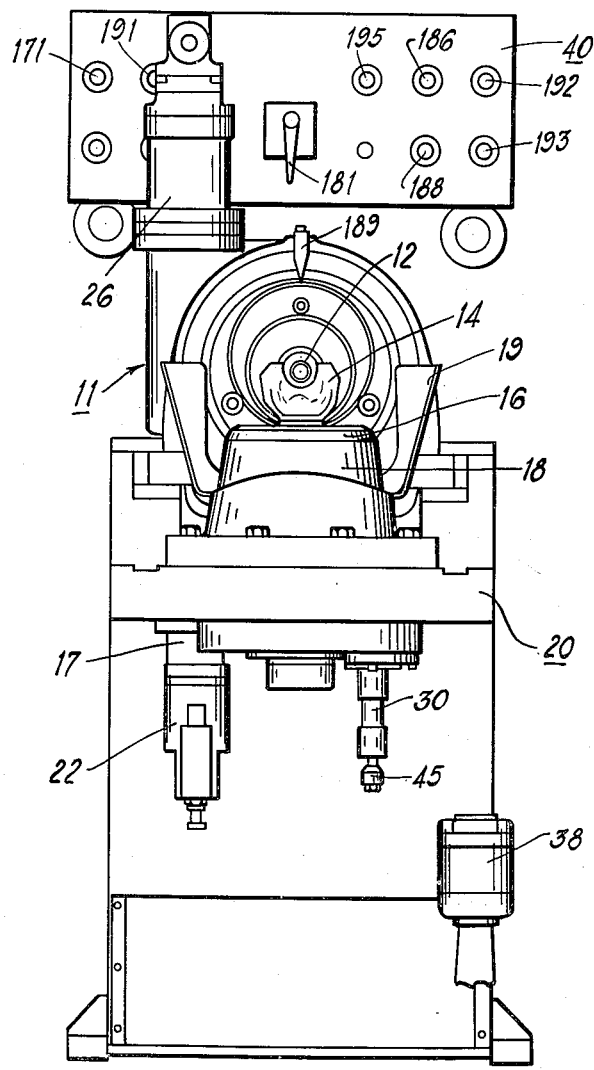

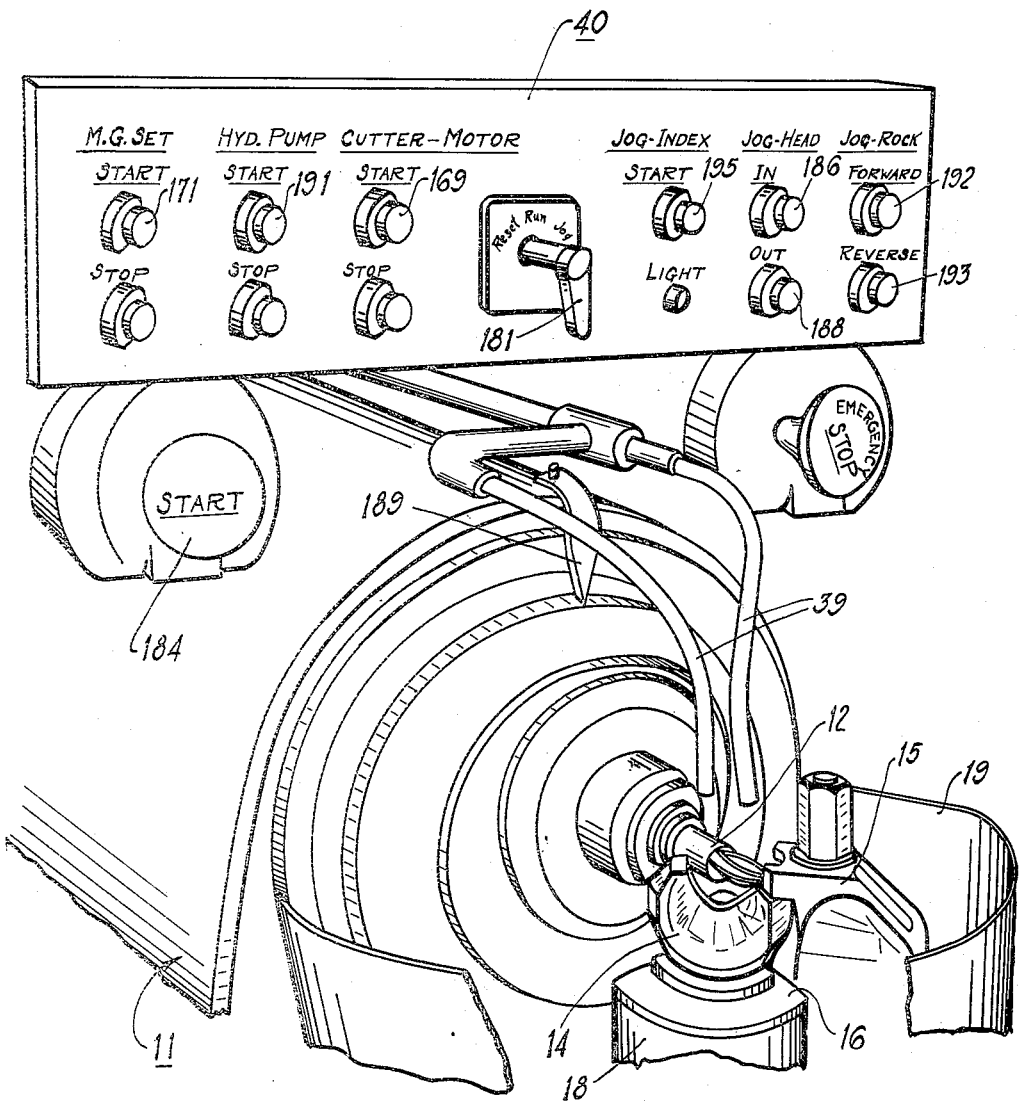

INVENTORS
ALFRED WESSTROM
KASPER K. FALK

United States Patent Office 2,972,935
Patented Feb. 28, 1961

2,972,935

BALL RACE CUTTING MACHINE

Alfred Wesstrom and Kasper K. Falk, South Bend, Ind., assignors to The Bendix Corporation, a corporation of Delaware Filed May 24, 1954, Ser. No. 431,636

1 Claim. (Cl. 90—15.1)

This invention relates in general to cutting machines and in particular to a machine for cutting ball races in a universal joint mechanism adapted to be used in an automotive vehicle.

It is an object of our invention to provide a machine of relatively few parts, said machine serving, in one cycle of operation, to cut four ball races in one of the elements of a universal joint mechanism adapted to be used as part of the propeller shaft of an automotive vehicle.

Yet another object of our invention is to provide a cutting mechanism including a power operated work holding indexing table and locking mechanism operable to position and securely hold in place the work to be cut, and further including a power operated cutter head unit comprising a rotatable cutter tool, said unit being automatically operable, starting from a centered position of the unit and the cutter tool then rotating about its longitudinal axis, to successively first bodily rotate the cutter tool about the longitudinal axis of the unit; then bodily move said unit with its then rotating cutter tool toward the work, the cutter tool at the same time continuing its aforementioned bodily rotation; then successively effect two cutting operations of the work to provide one of four races to be cut; then bodily move the unit with its rotating tool away from the work, the cutter tool being concurrently rotated about the longitudinal axis of the unit; then unlock the work, index the same and subsequently lock the work preparatory to effecting the second of the four race cutting operations of the mechanism, the cutter tool being concurrently rotated as described above; then repeat, three times, the aforementioned rotating, bodily movement, indexing, locking and cutting operations to complete the operation of the mechanism, the completion of the cycle of operations finding the unit again in its centered position with the table locked and indexed to a position ready for another cycle of cutting operations.

Another object of our invention is to provide, in the aforementioned cutting mechanism of our invention, four separate motors, preferably hydraulic, for effecting the aforementioned indexing and locking operations of the work and the aforementioned rotating and bodily movements of the cutter head mechanism and cutter tool; and another object of our invention is to provide, in said cutting mechanism, electrical control mechanism automatically operative, after the manual operation of certain controls, to effect the aforementioned cycle of operations of said cutting mechanism. As to the four hydraulic motors, one of the same is operative to effect the indexing operation of the work, the second is operative to effect the locking and unlocking of the work, the third is operative to effect an in and out operation of the cutter head unit to move the cutter tool into and away from its cutting position, and the fourth is operative to effect a rocking operation of the cutter tool to perform its work.

Yet another object of our invention is to provide, in the aforementioned cutting mechanism, means for effecting, at the will of the operator, a so-called jog that is independent operation of any one of the indexing motor, the cutter head advance or retract operating motor, and the rock motor; and a further object of our invention is to provide, in the cutting mechanism, means operable, in the event of a stoppage during any part of the automatic cycle, for resetting that is returning both the index table and the cutter head unit back to their starting that is loading positions.

Other objects and features of the invention will be apparent from the following description taken in connection with the accompanying drawings which form a part of the specification, and in which:

Figure 5 is a sectional view, taken on the line 5—5 of Figure 4, disclosing other details of a portion of the switch mechanism of our invention and the cam means for operating said mechanism;

Figure 6 is a front elevational view of the mechanism of our invention;

Figure 7 is a view disclosing, in perspective, the front end of the mechanism of our invention, together with the master electrical control board for said mechanism;

Figure 10 is a diagrammatic view disclosing the control switch mechanism of our invention which is actuated by the index table;

Figure 12 is a chart disclosing the several switch settings of the manually operated master switch control panel 40 of our invention.

Figure 1:
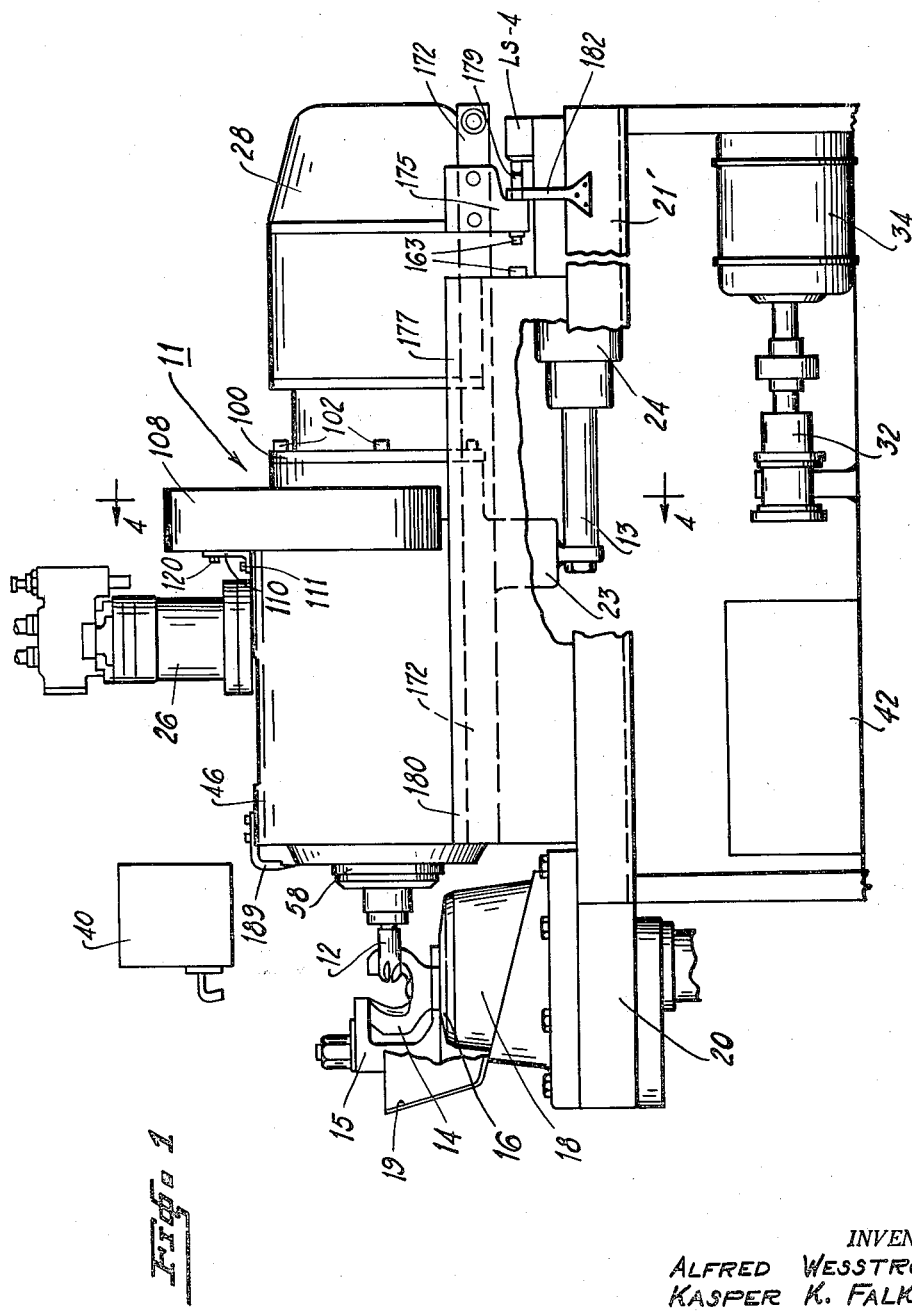
Figure 1 is a side elevation view disclosing a ball race cutting mechanism said mechanism constituting one embodiment of our invention.
Figure 8:
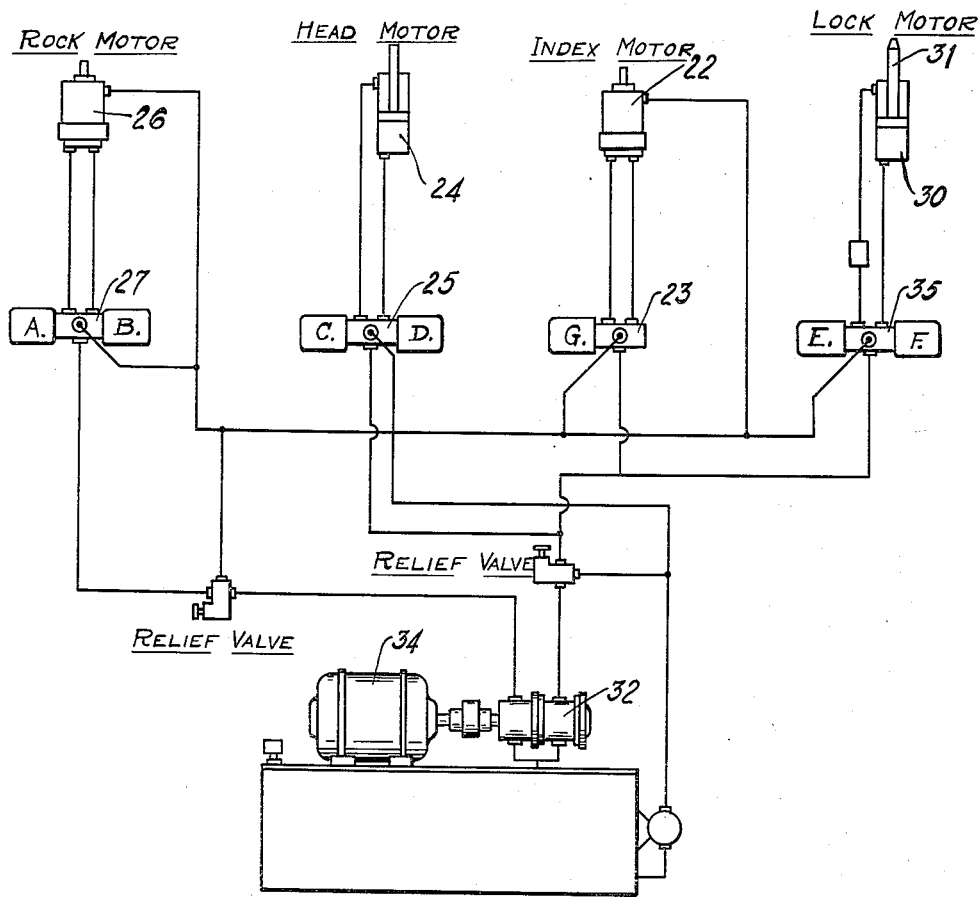
Figure 8 is a view disclosing a piping diagram of the hydraulic controls of our invention.

There is disclosed in Figure 1 a ball race cutting mechanism constituting one embodiment of our invention. This mechanism includes a power operated cutter head unit 11 including an axially mounted power operated rotatable cutting tool 12 said head unit with its cutting tool being bodily movable to and from a work piece 14 preferably a coacting jaw member of a universal joint mechanism adapted for use in an automotive vehicle. The work piece 14 is detachably mounted, by means of a manually operable clamp 15, Figure 7, in a power operated rotatable index table 16 mounted in a standard 18 which is secured to a table 20 which supports the entire mechanism of our invention. A shield 19 protects the operator from the oil spray. A pressure differential operated motor 22, Figures 2, 6 and 8, preferably a hydraulic motor controlled by a valve 23, Figure 8, is mounted on the table 20 and serves, by means of suitable gearing mounted in a housing 17, Figure 6, to rotate in one direction, that is index, the table 16 and work piece 14 secured thereto. In this indexing operation the work piece is successively rotated four times in one direction, each of these increments of rotation completing 90° or one-fourth of a complete turn. As is disclosed diagrammatically in Figure 10 the index motor 22 actuates, by means of cam 15', limit switches LS-10 and LS-6 which may be mounted in a housing 21, Figure 2. No claim is made to the motor 22 and its valve 23, accordingly this mechanism is not disclosed in detail.

A double acting pressure differential operated motor 24, preferably a hydraulic motor fixedly mounted on a cross member 21' secured to the table 20 and controlled by a valve 25, Figure 8, serves to effect the bodily movement of the head unit 11 from a retracted position of rest toward the work 14; and after a hereinafter described cutting operation the motor 24 is then operative to move the head unit bodily away from the work 14 and toward its starting position. The unit 11 is connected to the power element, not shown, of the motor 24 by means of a rod member 13 secured to a projection 23' which is secured to the unit 11.

A reversible so called rack motor 26, preferably a hydraulic motor controlled by a valve 27 and constituting a part of the head unit 11, serves to bodily rotate that is rock the cutter tool 12 concurrently with the aforementioned forward and backward bodily movement of the unit. In this rocking operation, the unit 11 is alternately rotated clockwise and counterclockwise for a purpose to be described hereinafter. No claim is made to the fluid pressure motors 24 and 26 per se and their control valves per se, accordingly the same are not disclosed in detail in this specification.

Figure 11:
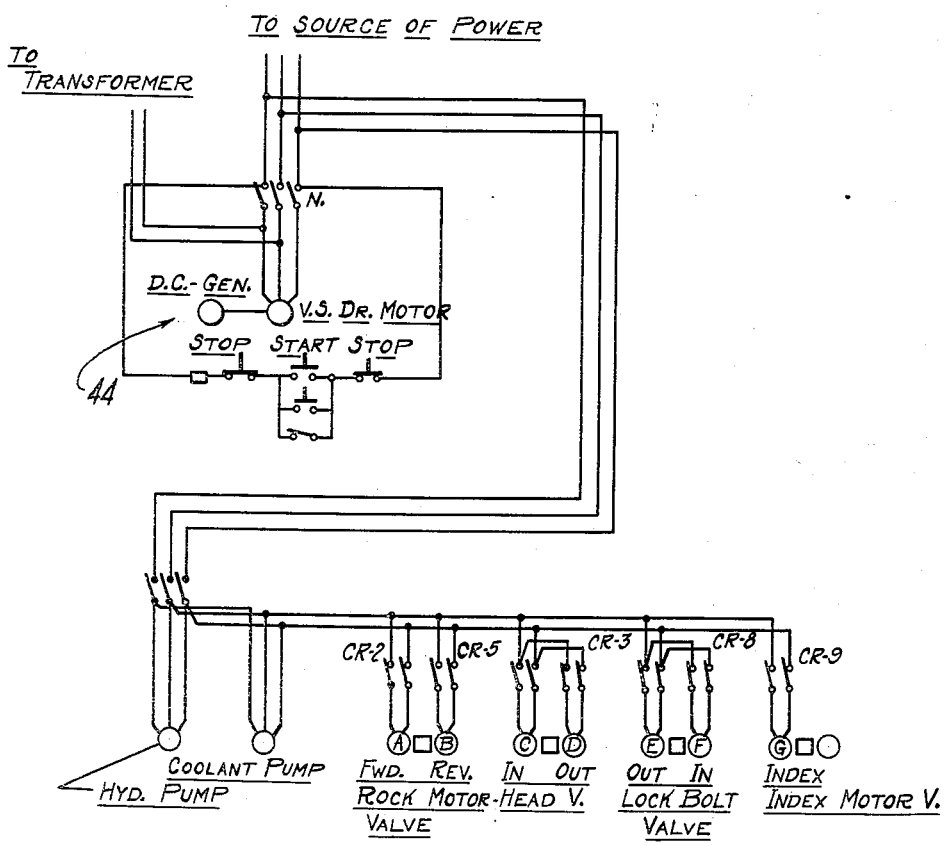
Figure 11 is a view diagrammatically disclosing certain of the controls of our invention including the aforementioned transformer, the motor generator unit, the solenoids for operating the control valves of certain motors, and the hydraulic and coolant pumps.

Continuing the description of the principal features of the mechanism of our invention there is provided (1) a variable speed electric motor 28 for effecting a constant rotation of the cutting tool 12 during the operation of the mechanism, (2) a double acting motor 30, preferably hydraulic and controlled by a valve 35, Figure 8, for actuating a lock bolt 31, Figure 8, to hold the index table 16 and its work 14 in locked position when the latter is being cut, (3) a hydraulic pump 32, Figure 8, for supplying the fluid, preferably oil, under pressure to the motors 22, 24, 26 and 30, (4) an electric motor 34, Figure 8, for operating the pump 32, (5) an electrical motor operated coolant pump unit 38, Figure 6, said unit serving, by means such as a tube 39, Figure 7, to spray a lubricant, say oil, over the work 14 as it is being cut, (6) an electric control panel board 40, Figure 7, mounted at the front end of the machine serving as a support for the master control switches of our invention and also as a support for control switches 1 to 10, Figure 12, said switches being operated by a manually operated control lever 181 mounted on the board, (7) a unit 42, Figure 1, serving as a housing for the electrical relays of the electrical mechanism of our invention, and (8) a motor generator unit 44, Figure 11, which may be mounted above the unit 11, for supplying the electrical power for the variable speed cutter motor of our invention. As is disclosed in Figure 2 the motor 30 serves, through the medium of a cam member 45 secured to the power element of said motor, to actuate a crank 47 which in turn actuates a limit switch LS-5 one of the so-called control switches of our invention. No claim is made to the motors 28, 30, 34, the valve 35, pump 32, or the units 38 and 44, accordingly the same are not disclosed in detail.

Figure 2:
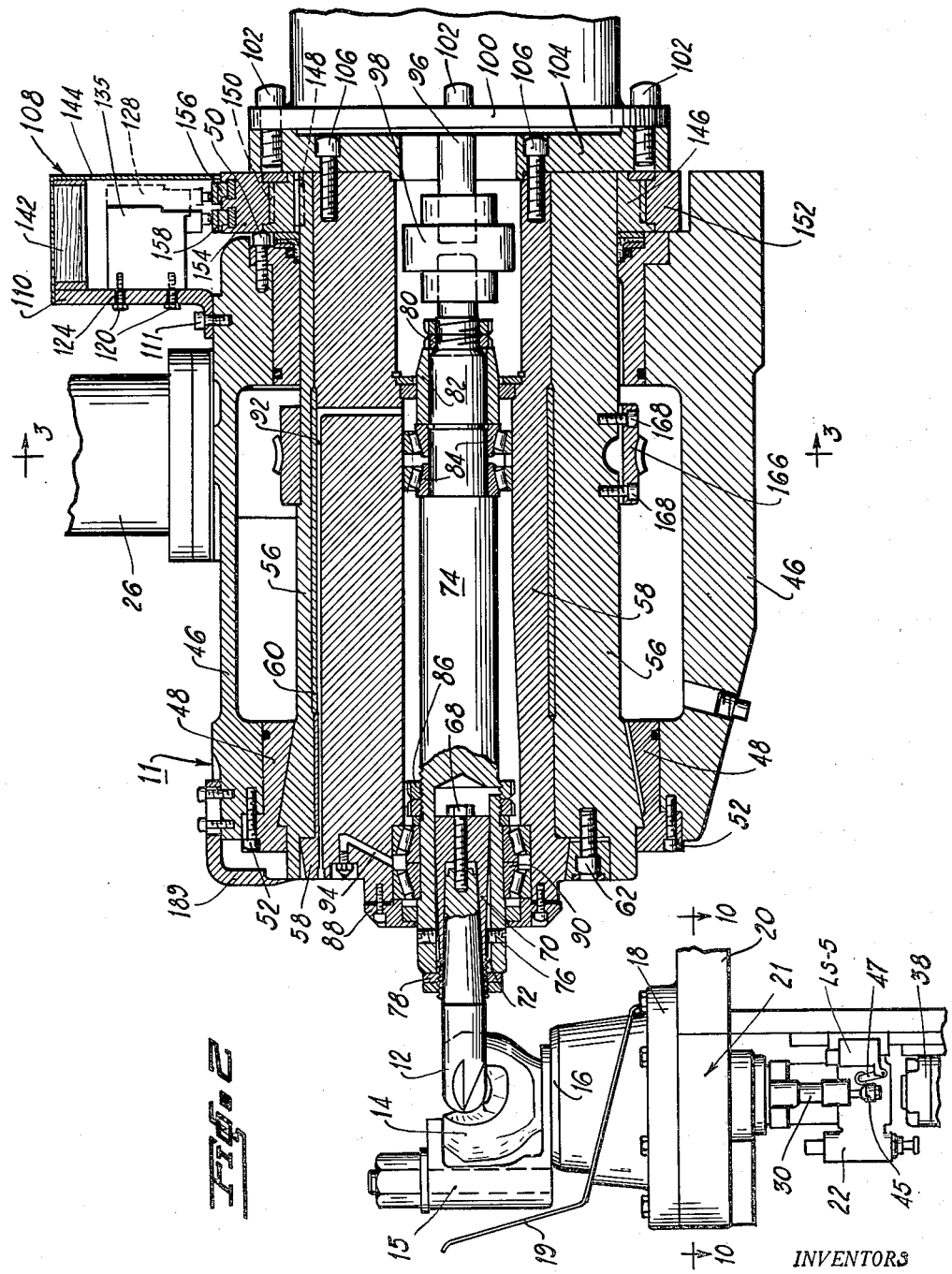
Figure 2 is a view disclosing the cutter head unit of Figure 1 in longitudinal section and the work locking means and index table and control the means therefor in side elevation.

Describing now in greater detail the head unit 11 the same includes a two part body member comprising parts 46, 48, Figure 2, secured together preferably by bolts 50 and 52; and further includes an eccentric including parts 56 and 58, preferably secured together by a key 60 and bolts 62, mounted within the two part body member 46, 48. The cutter tool 12 is secured, by a bolt 68, to a tapered fitting 70 which is fitted within a cylindrically shaped recess 72 in the outer end of a shaft member 74. Set screws 76, threadedly mounted in the end of the shaft 74, serve to hold the cutter tool 12 in place; and nuts 78, threadedly mounted on the outer end of the member 70 and abutting the end of the shaft 74, aid in taking the thrust of the cutter tool 12 against the shaft when the cutter is performing its cutting operation on the work 14.

Nuts 80, Figure 2, threadedly mounted on a reduced portion of the shaft 74, serve, together with a sleeve 82, to hold a shaft bearing 84 in place; and nuts 86, together with a cap 88 secured to the eccentric member 58, serve to hold a shaft bearing 90 in place. Oil ducts 92 and 94 serve, respectively, as a means for conducting lubricant to the bearings 84 and 90. The shaft 74 is connected by a universal joint 98 and a shaft 96 to the drive shaft of the variable speed electrical motor 28 the housing of the latter having a flange 100 secured thereto. This flange is secured by bolts 102 to a ring 104 which is secured, by bolts 106, to the eccentric member 58.

One of the principal electrical control features of our invention lies in a switch mechanism 108, Figures 2, 4, 5 and 10, constituting part of the head unit 11. This mechanism includes a box like casing comprising a ring like support member 110 extending substantially half way around the unit 11 said member being secured by bolts 111, Figure 2, to the body member 46. Box like members 116 and 118, housing switches LS-1 and LS-7 respectively, are adjustably mounted within the casing; and to effect this mounting there are provided pins 120 threadedly mounted in the body of members 116 and 118, each of said pins being slidably mounted in annular slots 124 in the member 110. There is thus provided means for adjusting the position of each of the aforementioned switch mechanisms. As disclosed in Figures 2, 4 and 5 there are also provided switch box members 126 and 128 of greater depth than the switch box members 116 and 118, said members 126 and 128 serving, respectively, to house switches LS-3 and LS-9 described hereinafter; and completing the description of the switch mechanism of Figures 2, 4, and 5 a switch box member 135 houses a so-called check stop switch LS-11; and switch box members 134 and 136, house, respectively, switches LS-2 and LS-8 described hereinafter. As with the members 116 and 118, the box members 126, 128, 134, 135 and 136 are adjustably secured to the support member 110 by pins 120. A compartment 142 at the outer circumference of the casing 108 serves to house the electrical wiring extending from the several switches; and a cover plate 144 detachably secured to the casing 108 serves to complete the housing of said switches.

Describing now the means for operating the aforementioned seven switches of the switch mechanism 108 there is provided a ring member 146, Figure 2, sleeved over the inner end of the eccentric member 56 and secured thereto by a key 148. Sleeved over the member 146 and secured thereto by a key 150, there is provided a ring member 152 said member having secured thereto an outwardly extending flange 154, Figure 4. The flange 154 is provided with two annularly extending slots, Figure 5, extending parallel with each other and within which there are adjustably mounted cam members 156, 158 and 160. As will be described hereinafter these three cams, with the rotation of the ring 152 with respect to the normally open switches LS-1, LS-2, LS-3, LS-7, LS-8, LS-9 and LS-11, serve to momentarily close said switches. Describing this relative rotation of the ring 152 with respect to the seven switches this operation is effected by the hydraulically operated reversible motor 26. As is disclosed in Figure 3, a rotating shaft 162 of this motor has keyed thereto a worm 164 meshed with a ring gear 166 which is secured by bolts 168, Figure 2, to the outer member 56 of the eccentric 56, 58; accordingly energization of the motor 26 serves to rotate the eccentric and the cam members 156, 158 and 160 secured thereto in one direction or the other depending upon the direction of rotation of the motor shaft 162; and the latter operation depends, of course, upon the operation of the valve 27, Figure 11, which controls said motor.

Figure 3:
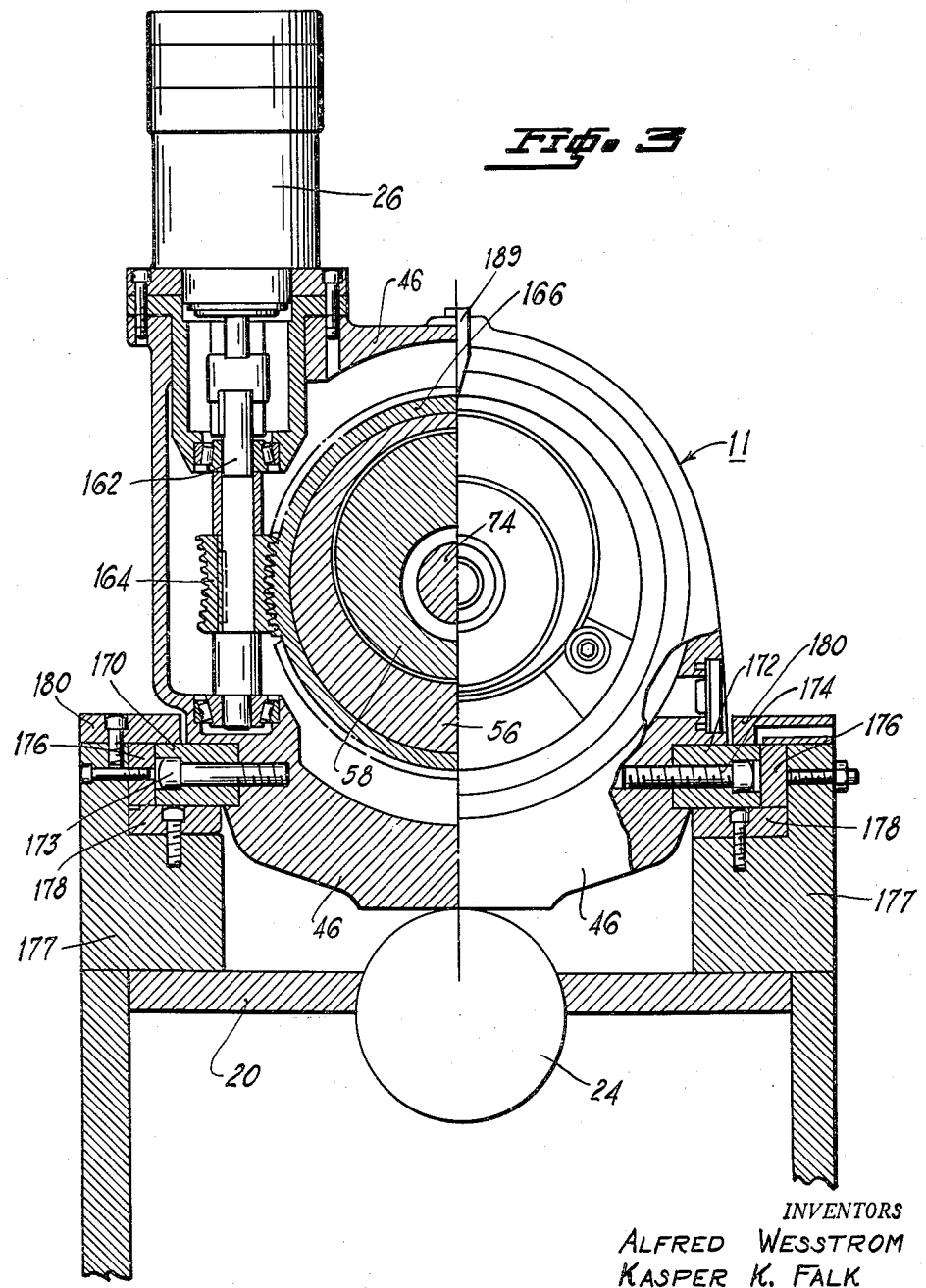
Figure 3 is a view, partly an end elevation and partly a sectional view taken on the line 3—3 of Figure 2, disclosing details of the cutter head eccentric of our invention and the motor for driving this eccentric.

Describing in greater detail the structure of the table 20 and cooperating parts of the head unit 11, support members 170 and 172, Figure 3, of like construction and rectangular shaped in cross section, are secured by bolts 173 and 174 respectively to the body member 146. These support members 170 and 172 extend lengthwise of the head unit 11 and fit within channels provided by portions of the table structure. As is disclosed in Figure 3 these channels include strips of metal 176 and 178 a pair of said strips being located on each side of the table and secured to a body portion 177 of the table structure by suitable fastening means. Annular strips of metal 180, rectangular shaped in cross section and suitably secured to the table structure, complete the channel structure or ways within which the head unit 11 slides to and from the work 14.

A stop member 182, Figure 1, secured to a part of the body of the table 20, cooperates with a stop member 175 mounted on the member 172 in serving to limit the rearward movement of the head unit 11 away from the work 14 and incidently protect an electrical switch LS-4 which is mounted on the casing of the motor 24. A switch operating member 179 is secured to the stop member 175, accordingly the stop 175, 182 serves to protect the switch LS-4 by limiting the degree of backward movement of the unit 11. A stop member 163 having a part thereof mounted on the member 175 and a part mounted on the table member 177, serves to limit the forward movement of the unit 11 in its travel toward the work 14.

Figure 9:
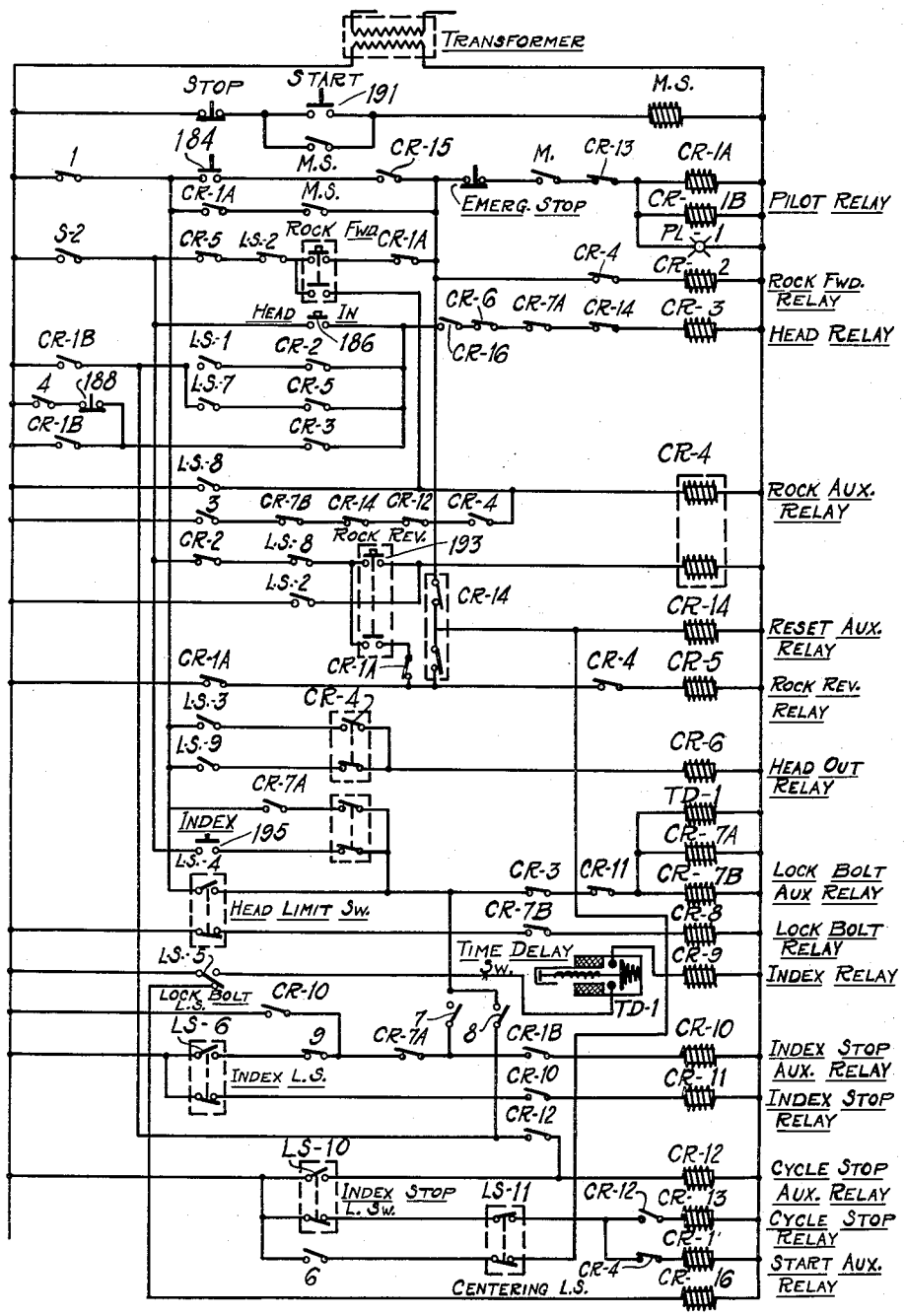
Figure 9 is a view disclosing a wiring diagram of the electrically interconnected control switches and electrical relay mechanism with control power transformer of our invention.

Describing now the complete operation of the mechanism of our invention and incidently describing elements, particularly electrical elements, not heretofore described, it will be assumed that (1) the control lever 181, Figure 7, is placed in its run position thereby closing switches 1, 9 and 10, Figures 9 and 12, (2) motor generator unit 4, Figure 11, hydraulic pump 32, coolant pump 38 and cutter motor 28 are running by a closure of switches 171, 191 and 169, Figure 7, (3) the index table 16 is in its loading position and (4) the parts of the head unit 11 are back and centered as indicated by a pointer 189, Figures 2 and 7, the switch LS-11 being at the time closed by the cam 158. In the description to follow reference is had to Figures 9 to 12 inclusive disclosing the principal electrical controls of our invention. In Figure 9 all switches are shown with contacts in the position they assume with head unit 11 centered and in retracted position and the work, that is index table 16, in its loading position. The letters LS in Figure 9 and throughout this specification are an abbreviation for the words limit switch. In Figure 10 limit switch LS-6 is disclosed as being operated by a cam 15 in each of the four positions of the table 16 and limit switch LS-10 is operated by a cam 15 in the loading position of the table only.

With the parts of our invention in the position and/or condition described immediately above a relay switch CR-15, Figure 9, completes a circuit through switches LS-10, LS-11 and a normally closed contact of switch CR-4. A cycle start switch 184, Figures 7 and 9, is then manually closed by the operator of the mechanism thereby completing a circuit including pilot relay coils CR—1A and CR—1B and a then closed relay switch CR-15, said pilot relay coils being held in through switch CR—1A and switch MS of a hold down circuit. With this operation a relay coil CR-2, Figures 9 and 11, is energized, the circuit including the normally closed switch of CR-4. The valve 27 of the rock motor 26, Figure 7, is, with the operation of relay switch CR-2, operated by a solenoid A, Figure 11, to energize said motor to initiate a turning movement of the eccentric 56, 58 to the right looking into the mechanism from the front of the same. In this operation the eccentric and the switch operaitng cams 156, 158 and 160 secured thereto, rotate to the left as disclosed in Figure 4.

Figure 4:
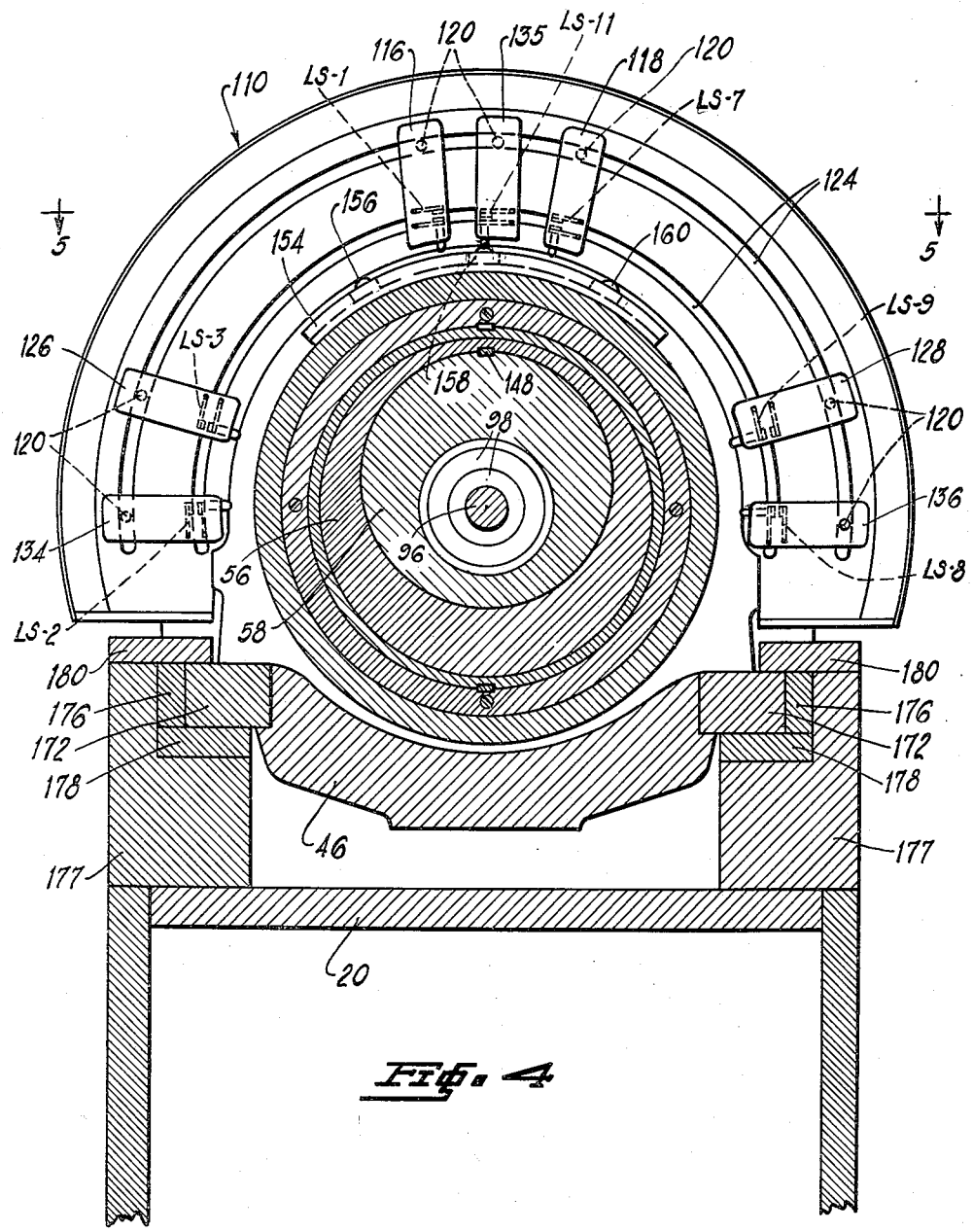
Figure 4 is a sectional view, taken on the line 4—4 of Figure 1, disclosing other details of the cutter head eccentric together with some of the principal features of the control switch mechanism of our invention and the cam means for operating said switch mechanism.

When the cam 158 moves sufficiently to the left, Figure 4, to close the switch LS-1 then relay coil CR-3 is energized. The latter is held in by its own contact providing the lock bolt 31, Figure 8, is in its holding position and switch CR-16 is closed. This operation of the relay CR-3 serves to energize a solenoid C which operates, the valve 25, Figure 8, thereby energizing the motor 24 to initiate a bodily movement of the head unit 11 and its cutter tool toward the work 14 and into cutting position; and it is to be remembered that the cutter tool 12 is, during this operation, also being rotated to the right, Figure 3, by the rock motor 26. It is to be noted at this point that the forward bodily movement of the unit 11 is, at the time, terminated by the stop 163 despite the then energized condition of the motor 24. With the moving forward of unit 11 switch LS-4 is released and closes a circuit to relays CR—7A and CR—7B and a time delay relay TD-1 the operation of which is delayed after its deenergization. These relays will hold in through switch CR-7A. As the unit 11 reaches the end of the forward rocking, that is cutting stroke, switch LS-2 is closed by the cam 156 thereby energizing CR-4 latch coil, this relay being held in mechanically. Relay CR-2 will now drop out and CR-5 wil be picked up due to the action of the CR-4 contacts; and this operation results in an energization of a solenoid B which operates the rock motor valve 27. The motor 26, by the operation of its valve 27, will then reverse the direction of rotation of the eccentric and the cutter tool 12 will make its return work stroke.

With the reversal of the eccentric cam 156 will then close switch LS-3 thereby energizing CR-6 through switch CR-4 which is now closed; and the CR-3 coil circuit will then be opened. This operation, that is cutting the latter relay out, will, by operating a solenoid D, operate the valve 25 to energize the motor 24 to initiate a movement of the unit 11 back toward its starting position it being remembered that the forward movement of said unit was interrupted by the operation of the stop 163. When the unit 11 has moved back far enough to close the switch LS-4, Figure 1, then CR-8 will be energized through CR—7B which was closed by the forward motion of the unit 11. CR-8 then energizes a lock bolt out solenoid E resulting, by an operation of the motor 30, in pulling the lock bolt 31 out and a closing of switch LS-5. The latter switch will then energize CR-9 through TD-1 relay switch which is now closed. CR-9 will then energize a solenoid G thereby operating the valve 23 to effect an energization of the table indexing motor 22. The valve 23 of this motor is preferably of the spring centering type and cuts the motor 22 off when deenergized.

As the index table turns, a cam plate 190, Figure 10, actuated by the power element of motor 22, serves, through the medium of the cams 15, to operate switches LS-10 and LS-6. Switch LS-6 will then, by its closing, energize relay coil CR-10, which coil holds itself in through its own switch. As index table 16 reaches its almost fully indexed position switch LS-6 is again closed by a cam 15 thereby energizing coil CR-11 through switch CR-10 which is at the time closed. CR-11 will then open the circuit to relay coils CR-7A and CR-7B and TD-1; and these relays will cut out CR-8, CR-10 and CR-11 at once thereby reversing the action of the lock bolt motor 30. Coil CR-9 will remain energized for a short time due to the time delay operation of TD-1; and the lock bolt 31 will then again drop into its locking position. The operation of switch LS-10 by a cam 15 will pick up CR-12 which holds in through its own switch. This relay has no further function until the end of the cycle. As noted above switch LS-6 is operated by all four cams 15 of the plate 190, one for each work position of the index table; and switch LS-10 is operated by only one of said cams, that is when the table is in its loading position.

The operation of the mechanism of our invention described immediately above covers the cutting of but one, that is the first of the four races to be cut in the work; accordingly this cutting operation is repeated three more times however a detailed description of these three operations will not be given in this specification. After the last, that is the fourth, of these cutting operations the cycle is completed by an indexing and locking of the work and a return of the unit 11 to its starting position.

Briefly describing the second race cutting operation of the mechanism and also describing the aforementioned last stage of operation of the cycle after the fourth race cutting operation is completed, the rocking of the eccentric 56, 58 of the unit 11 will, after the work indexing and locking operations at the end of the first race cutting operation, continue in a reverse direction that is to the right Figure 4; and when a cam 158 operates switch LS–7 the head unit 11 will, by an operation of the motor 24, again move forward into milling that is cutting position. The unit 11 will continue its movement to the right, Figure 4, to initiate the second cutting operation of the work and when the cam 160 operates the switch LS–8 the unit 11 will be reversed to complete this cutting operation. With the closing of the switch LS–8 the CR–4 latch coil is energized returning the relay to its forward position. Continuing the cycle of operations when the unit 11 is reversed, that is to the left, Figure 4, far enough to actuate the switch LS–9 by the cam 160 this operation serves to energize CR–6 through CR–4 which is now closed. The unit 11 is now, by the operation of the motor 24, moved back toward its starting position; and the cycle of operations of the unit 11, the index table 16, and the locking bolt 31 is then continued until all four race cutting operations have been completed.

After the fourth race is cut and the unit 11 retracted, the index table 16 will index to its loading position and in this operation switch LS–10 will be operated. In this very last stage of the operations the unit 11 is rocking in a forward direction that is to the left, Figure 4, and when the cam 158 on said unit reaches its center position switch LS–11 is operated. As switch LS–10 is now in its operated position and switch CR–12 has remained closed since the first index operation, CR–13 will be energized thereby opening the CR—1A and the CR—1B coil circuit thereby completing the entire operation of the mechanism.

Describing now the so-called jog operations of the mechanism of our invention there are three of these machine functions, that is the head unit in and out operations, the head rocking operations, and the index table operation. These operations are employed to facilitate the desired adjustment and setting of the parts of the mechanism.

Describing now these jog operations of the mechanism the control lever 181, Figure 7, is placed in its jog setting thereby closing switches 2, 4, 7 and 9, Figure 12. To effect a head in operation of the unit 11 the operator will then close a switch 186, Figure 7 and 9, which operation results in an energization of coil CR–3. This relay is held in through its own contact; and head out push button relay CR–3 energizes solenoid C, Figures 8 and 11, thereby effecting an operation of the valve 25; and this operation results in an energization of the motor 24 to move the unit 11 with its cutting tool 12, into its working position. To effect a head out jog operation of the unit 11 the operator closes a switch 188, Figures 7 and 9; and this operation cuts CR–3 out and effects, through the operation of the solenoid D and the valve 25 controlled thereby, an operation of the motor 24 to return the unit 11 back to its starting position.

Describing the jog operation of the rocking motor 26 to at will rock the unit 11 either clockwise or counterclockwise from its starting position, two double element push button controls 192 and 193, Figures 7 and 9, control, respectively, the clockwise and counterclockwise movement of the eccentric 56, 58, Figure 3. One element of the push button station controls CR–4 relay which will position for the particular direction; the second element controls CR–2 for forward, or CR–5 for reverse. If the head is rocked to the end of its stroke the limit switch will prevent overtravel and simultaneously reverse the CR–4 position for opposite rocking of the head.

Describing now the jog operation of the index table 16, with the head unit 11 back in its starting position the closure of a switch 195 results in an energization of CR—7A, CR—7B and TD–1. Contact CR—7B then energizes lock bolt relay CR–8 resulting in an operation of the lock bolt valve 35, Figure 8. The lock bolt motor 30 is then energized and the lock bolt 31 operates LS–5 energizing index relay CR–9 through TD–1 contact. As the table 16 turns, LS–6 is operated holding CR—7A, CR—7B and TD–1 closed through CR—7A contact. If the index push button, controlling the switch 195, is released the table will index only once; if the button is held depressed to hold the switch 195 closed the table will continue indexing.

Describing the reset operation of the mechanism, an operation resorted to in the event of stoppage during any part of the automatic cycle, the control handle 181 is placed in its reset position, Figure 7; and this operation effects a closure of switches 3, 6 and 8, Figure 12. In the resetting of the head unit 11 control switch 6 will energize CR–14 thereby energizing the rocking relays CR–2 or CR–5 depending on the position of CR–4 contacts. If the rocking was away from center position when the machine was stopped the rocking will complete its stroke, then reverse its operation. As the unit 11 reaches center the cam 158 will depress LS–11, dropping out CR–14 and the rocking relays, that is either CR–2 or CR–5; and this operation will bring the mechanism to a stop. If the rocking operation was in a reverse direction CR–4 unlatch coil will be energized through switch 3 and normally closed contacts of relays CR—7B, CR–14, CR–12 and contact on CR–4 which is closed for reverse rocking. Relay CR–4 then resets and is ready for normal automatic operation.

As to a table reset operation with the table out of position LS–10 energizes CR—7A, CR—7B and TD–1 relays through the CR–12 contact and switch 8. Relay CR—7B will then energize the lock bolt relay CR–8 and with the lock bolt out limit switch LS–5 will energize index relay CR–9 through TD–1 contact. The relays are held in by LS–10 only, and the table will turn continuously until it reaches the loading position and the cam plate 190, Figure 10, opens the LS–10 circuit and drops out all relays.

There is thus provided a compact power operated mechanism of relatively few parts for automatically, and in one cycle of operation, cutting the four races of a coacting jaw member of a universal joint mechanism adapted to be used in an automotive vehicle. To effect this operation the operator of the machine need but place the control lever 181, Figure 7, in its run position, start the cutter motor 28 by the closing of the switch 169, Figure 7, start the motor generator unit 44, Figure 11, by closing the switch 171, start the coolant pump 38 and hydraulic pump 32 by closing the switch 191, Figure 9, load the machine with the work 14 to be cut, and then close the starter switch 184, Figures 7 and 9. Having performed these operations the mechanism will then operate automatically to effect the cutting of the work. Should there be a stoppage of the mechanism during the aforementioned cycle of operation, the operator may effect a reset operation, that is bring the parts of the mechanism back to their starting position, by a setting of the control lever 181, Figure 7, in its reset position; and should the operator desire to effect an independent operation of the index table 16, or an independent operation of the head unit 11 to rock the latter or move it in or out, he need but close the necessary jog switch located to the right of the lever 181 in Figure 7.

Although but one modification of the invention has been particularly described, it is understood that many changes may be made in the form and arrangement of the parts without departing from the scope of the invention.

We claim:

An automatically operable mechanism for, in succession, performing a plurality of different cutting operations upon a work piece said mechanism including a bodily movable head unit comprising a body member, a flange member, an eccentric housed within the body member, secured to the flange member, and rotatable about the longitudinal axis of the unit, a rotatable shaft mounted within the eccentric said shaft being bodily moved when the eccentric is being rotated, a cutting tool mounted on one end of the shaft, means for operating the shaft and in part controlling the operation of the mechanism, said means including an electrical motor, mounted on the flange, for operating the shaft, a motor, mounted on the body member, for operating the eccentric, switch mechanism mounted on the body member, and means for operating said switch mechanism, including cam means, secured to the eccentric; index means, including a plurality of motors, for positioning and holding in position the work piece to be cut; means, including a motor, for bodily moving the head unit toward and away from the work piece to be cut said movements being synchronized with the operation of the index means; and means, including electrical means cooperating with the aforementioned switch mechanism and switch operating means, for controlling the operation of the mechanism.

References Cited in the file of this patent

UNITED STATES PATENTS

| | | |
|---|---|---|
| 2,086,915 | Kopp | July 13, 1937 |
| 2,301,028 | Esch | Nov. 3, 1942 |
| 2,352,753 | Anderson | July 4, 1944 |
| 2,362,054 | Denison | Nov. 7, 1944 |
| 2,433,564 | Keller et al. | Dec. 30, 1947 |
| 2,531,890 | Pearson | Nov. 28, 1950 |
| 2,604,759 | Smith | July 29, 1952 |
| 2,662,450 | Angell et al. | Dec. 15, 1953 |
| 2,667,820 | De Vlieg | Feb. 2, 1954 |
| 2,751,823 | Freter | June 26, 1956 |

FOREIGN PATENTS

| | | |
|---|---|---|
| 114,145 | Great Britain | May 9, 1918 |